US010063275B2

(12) United States Patent
Tidestav et al.

(10) Patent No.: US 10,063,275 B2
(45) Date of Patent: Aug. 28, 2018

(54) METHOD, COMPUTER PROGRAM AND NETWORK NODE FOR HANDLING INTERFERENCE CAUSED BY INTER-MODULATION

(71) Applicant: Telefonaktiebolaget LM Ericsson (publ), Stockholm (SE)

(72) Inventors: Claes Tidestav, Bålsta (SE); Bo Hagerman, Tyresö (SE); Bengt Lindoff, Bjärred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/545,886

(22) PCT Filed: Feb. 6, 2015

(86) PCT No.: PCT/EP2015/052518
§ 371 (c)(1),
(2) Date: Jul. 24, 2017

(87) PCT Pub. No.: WO2016/124248
PCT Pub. Date: Aug. 11, 2016

(65) Prior Publication Data
US 2018/0019784 A1    Jan. 18, 2018

(51) Int. Cl.
*H04B 1/44*       (2006.01)
*H04B 1/525*     (2015.01)
(Continued)

(52) U.S. Cl.
CPC ........... *H04B 1/525* (2013.01); *H04L 5/0073* (2013.01); *H04W 52/146* (2013.01);
(Continued)

(58) Field of Classification Search
CPC ....... H04L 5/14; H04L 5/0048; H04L 5/0053; H04L 1/0003; H04L 1/0009; H04L 5/001;
(Continued)

(56) References Cited

U.S. PATENT DOCUMENTS

| 2009/0190485 A1 | 7/2009 | Bjorkegren et al. |
| 2010/0120446 A1* | 5/2010 | Gaal ................. H04W 72/1231 455/452.2 |

(Continued)

FOREIGN PATENT DOCUMENTS

| EP | 2685768 A1 | 1/2014 |
| GB | 2508383 A  | 6/2014 |

(Continued)

*Primary Examiner* — Ajibola Akinyemi
(74) *Attorney, Agent, or Firm* — Sage Patent Group (57) ABSTRACT

A method of handling interference caused by inter-modulation in a network node site comprising a set of network nodes for wireless communication capable of communication with a set of stations for wireless communication is disclosed. The stations are wireless transceiver devices and communication from the network node to any of the stations is considered to be downlink communication and communication from any of the stations is considered to be uplink communication. The method comprises detecting an interference level on the uplink carrier frequency band for a subset of stations of the set of stations, and determining whether the interference level indicates probable inter-modulation interference. If the interference level indicates probable inter-modulation interference, the method proceeds with modifying a power control scheme for the subset of stations, and sending a parameter set based on the modified power control scheme to the subset of stations. A computer program and network node are also disclosed.

9 Claims, 5 Drawing Sheets (51) Int. Cl.
*H04W 52/14* (2009.01)
*H04W 52/24* (2009.01)
*H04L 5/00* (2006.01)
*H04W 52/36* (2009.01)
*H04B 1/10* (2006.01)
*H04W 52/08* (2009.01)
*H04W 52/22* (2009.01)

(52) U.S. Cl.
CPC ....... *H04W 52/243* (2013.01); *H04W 52/247* (2013.01); *H04W 52/365* (2013.01); *H04B 1/1027* (2013.01); *H04W 52/08* (2013.01); *H04W 52/228* (2013.01)

(58) Field of Classification Search
CPC ... H04L 5/0035; H04L 1/1861; H04L 5/0055; H04L 1/0038; H04L 1/1607; H04L 1/1812; H04L 41/0803; H04L 5/0007; H04L 1/0026; H04L 1/0035; H04L 1/0046

USPC .......................................................... 455/78
See application file for complete search history.

(56) References Cited

U.S. PATENT DOCUMENTS

2011/0319120 A1* 12/2011 Chen ................... H04W 52/367
455/522
2013/0044621 A1 2/2013 Jung et al.

FOREIGN PATENT DOCUMENTS

| WO | 2013171562 A1 | 11/2013 |
| WO | 2016082896 A1 | 6/2016 |
| WO | 2016124247 A1 | 8/2016 |

* cited by examiner

METHOD, COMPUTER PROGRAM AND NETWORK NODE FOR HANDLING INTERFERENCE CAUSED BY INTER-MODULATION

TECHNICAL FIELD

The present invention generally relates to a method for a network node, such a network node and a computer program for implementing the method. In particular, the present invention relates to handling interference caused by inter-modulation.

BACKGROUND

In wireless communication systems, interference by radio frequency (RF) transmitters for RF communication systems may become an issue.

The purpose of a transmitter in a digital wireless communication system is to convert a digital low-frequency baseband signal into an RF signal while preserving the modulation, and thereby the baseband information. In a full duplex system, a radio receives and transmits information simultaneously, which may be performed according to frequency duplex division (FDD), i.e. the radio transmits on one frequency and receives on another frequency. This means that, despite the fact that receive (RX) and transmit (TX) signals are spaced in frequency by a duplex distance, distortion products caused by nonlinearities in the transmitter may fall into the receive band and raise the over-all receiver noise figure, as well as discomply with a transmit spectrum mask. In order to reduce this effect, external cavity filters may be used in radio base stations (RBS) to filter out unwanted components outside wanted transmission band. However, intermodulation products caused by multiple transmitted signals, e.g. own TX signal in combination with an interferer signal, may also position unwanted tones in the receive band and thus degrade the receiver signal-to-noise-ratio (SNR). These unwanted tones are not possible to filter out by frequency filtering and they are thus to be handled by the receiver.

In a multi operator FDD RBS site solution, each operator uses a unique paired spectrum and the spectrum parts thus become separated in frequency not to interfere with each other's operations. There is no joint scheduling required among the operators, resulting in that simultaneous transmissions may occur. However, due to non-linear effects caused by for instance excitation of ferromagnetic materials or other physical properties, e.g. metal oxidation, mechanical disruptions, etc., passive intermodulation (PIM) products may be reflected back to or within the RBS site and fall into one of the operator's receive band and cause desensitization. As a result, the created PIM products caused by the multi operator transmissions may result in lowered received uplink SNR for some scenarios. The problem may also arise in the case when the same operator uses two different carrier frequencies, e.g. operating in carrier aggregation setup, in any direction. The problem may also affect or be affected by frequencies used for time division duplex (TDD) upon such relations between frequencies.

A normal operation to handle such problems would be to send a service technician to the RBS site to try to find the cause and replace or mend the causing element. However, such an operation may take a while, and there may be a not fully functioning RBS for a longer or shorter time.

In the case when two FDD downlink bands are separated by the same frequency distance as the duplex distance for one of the FDD receiver frequencies, third order PIM products may become collocated within a receive band without the possibility to be suppressed by filtering as discussed above. As a result, the noise level of the affected receiver will increase and lower received SNR in the uplink.

Figure 1:
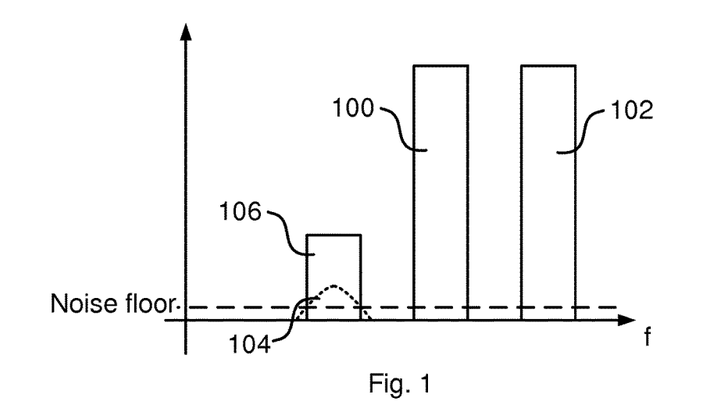
FIG. 1 schematically illustrates how inter-modulation issues may degrade a signal.

An example is illustrated in FIG. 1 where two transmitted signals 100, 102, for example 3GPP frequency band 29 and band 17, from the same RBS give rise to a PIM product 104, in this case due third order intermodulation, i.e. at $2 \cdot f1 - f2$, where f1 is the frequency of transmission in B17 and f2 is the transmission frequency in band 29, falling into the receive band 106 of band 17. As a result, in the band 17 the receiver will lower its sensitivity and face reduced coverage. Continuing this example with reference to FIG. 2, a base station 200 is operating a cell 202. The lowered sensitivity will decrease the possible coverage of the cell to a limited coverage 204. This could potentially lead to dropped connections or limited application coverage as illustrated by UE A 206 in FIG. 2, while for UEs closer to the network node 200, e.g. UE B 208, the communication may still work. This may lead to the operator missing traffic (to be billed) and/or less satisfaction by subscribers.

This may become more and more of a problem the more bands that are available, since with the more bands there will be larger risks for co-sited RBSs for different operators, which may create PIM affecting any of the operators' receive bands. For the sake of brevity and easier understanding, the issue has been demonstrated above where inter-modulation is caused by two frequencies, but the similar effects may arise from further used frequencies, and used frequencies inter-modulating with inter-modulation products, and so on. That is, the more frequencies used at a network node site, the more likely is it that an inter-modulation product affects a receive band.

It is therefore a desire to handle such situations.

SUMMARY

The invention is based on the understanding that when the above situation occurs, e.g. the case of intermodulation caused by occurred metal oxidation, and that by sacrifice of increased interference level by a change of a power control scheme, i.e. increased power level, the issues may be limited. Furthermore, the sacrificing of increased interference level may only be made until a service technician is able to get to the RBS site to try to find the cause and replace or mend the causing element. Hence, once a control unit in the NW node has determined a UE or a subset of UEs being affected by inter-modulation interference the NW node changes power control scheme to compensate for the higher interference level. Furthermore, the implementation may be controller based and hence implemented as a computer program (software) using already defined controller hardware.

According to a first aspect, there is provided a method of handling interference caused by inter-modulation in a network node site comprising a set of network nodes for wireless communication capable of communication with a set of stations for wireless communication. The stations are wireless transceiver devices and communication from the network node to any of the stations is considered to be downlink communication and communication from any of the stations is considered to be uplink communication. The method comprises detecting an interference level on the uplink carrier frequency band for a subset of stations of the set of stations, and determining whether the interference level indicates probable inter-modulation interference. If the interference level indicates probable inter-modulation interference, the method proceeds with modifying a power control scheme for the subset of stations, and sending a parameter set based on the modified power control scheme to the subset of stations.

The modifying of the power control scheme may be based on a metric of the determined interference level.

The method may comprise determining a maximum level of interference level, and setting a parameter, of the parameter set, assigning an average received power target of the power control scheme based on the maximum interference level.

The method may comprise determining an average level of interference level, and setting a parameter, of the parameter set, assigning an average received power target of the power control scheme based on the average interference level.

The modifying of the power control scheme is based on knowledge about downlink transmissions at corresponding time instants. The method may comprise setting a parameter, of the parameter set, assigning an incremental closed-loop power adjustment based on the knowledge about the downlink transmissions.

According to a second aspect, there is provided a computer program comprising instructions which, when executed on a processor of a network node, causes the network node to perform the method according to the first aspect.

According to a third aspect, there is provided a network node for wireless communication capable of communication with a set of stations for wireless communication. The stations are wireless transceiver devices and communication from the network node to any of the stations is considered to be downlink communication performed on a downlink carrier frequency band and communication from any of the stations is considered to be uplink communication performed on an uplink carrier frequency band. The network node comprises an interference level detector arranged to detect an interference level on the uplink carrier frequency band for a subset of stations of the set of stations, a controller arranged to determine whether the interference level indicates probable inter-modulation interference, and a transmitter. The controller is arranged to, if the interference level indicates probable inter-modulation interference, modify a power control scheme for the subset of stations, and set a parameter set based on the modified power control scheme for the subset of stations. The transmitter is arranged to send the parameter set to the subset of stations.

The controller may be arranged to the modify the power control scheme based on a metric of the determined interference level.

The controller may be arranged to determine a maximum level of interference level, and set a parameter, of the parameter set, assigning an average received power target of the power control scheme based on the maximum interference level.

The controller may be arranged to determine an average level of interference level, and set a parameter, of the parameter set, assigning an average received power target of the power control scheme based on the average interference level.

The controller may be arranged to modify the power control scheme based on knowledge about downlink transmissions at corresponding time instants. A parameter, of the parameter set, assigning an incremental closed-loop power adjustment may be based on the knowledge about the downlink transmissions.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Methods of handling interference, a network, NW, node and computer programs for the same are disclosed below. The interference on topic is caused by inter-modulation in a NW node, or NW node site comprising a plurality of co-located NW nodes, for wireless communication with a set of stations for wireless communication. A station in this context may for example be a user equipment, UE, a modem, a cellphone, a computer or, any electric or electronic device capable of wireless communication with a NW node. More and more items we previously knew as rather simple objects are now capable of this, which has, and will, provide for some of the great improvements in many fields, even outside the conventional telecommunication industry. Examples are sensors, machines, medical equipment, monitoring devices, etc. that has been enhanced by being able to wirelessly communicate with wireless nodes of different wireless communication systems.

In this disclosure below, embodiments are exemplified within an 3GPP LTE context for the sake of easier understanding, but the invention is not limited to that Radio Access Technology (RAT). Other RATs, such as any of the commonly used technologies for public land mobile networks, may benefit from the invention in a similar way.

Many cellular systems use open-loop power control. Here, a UE transmit power is adjusted to overcome the path loss and a nominal interference level in the system. Thus, the instantaneous interference level at the receiver is not taken into account. This works reasonably well as long as the actual interference level is not deviating from the nominal interference level over longer periods. The power control scheme in LTE is a good example of such an algorithm, where $P = \min \{P_{max}, 10 \log M + P_0 + \alpha \cdot PL + f(\Delta_i) + \Delta_{TF}\}$, here expressed in dBm.

Here, $P_{max}$ is the maximum transmit power of the UE, M is the number of resource blocks used for the current transmission and PL is the, by the UE, measured path loss. $\Delta_{TF}$ is a transport-format dependent offset that is configured by higher layers. $P_0$ and $\alpha$ are the received power target and fractional path loss compensation, respectively, which are parameters that are configured by the NW node, and $f(\Delta_i)$ represents an incremental closed-loop power adjustment, which is received from the NW node. Typically, $P_0$ is set to get a suitable Signal-to-Interference-and-Noise Ratio, SINR, target at the receiver, assuming a certain nominal interference level. If the actual interference level deviates from the nominal interference level, the received SINR will deviate from its desired value.

The present invention assumes that interference caused by inter-modulation effects is determined and/or estimated. This may be performed using different techniques, among which a few examples are demonstrated below. When significant such interference has been detected, power control scheme is modified to make the UE use a higher transmit power at such occasions. Looking at the equation above, $P_0$ and $f(\Delta_i)$ are parameters provided by the network node. By adapting one or both of them, the control scheme is modified to remedy the effects of the interference.

Figure 3:
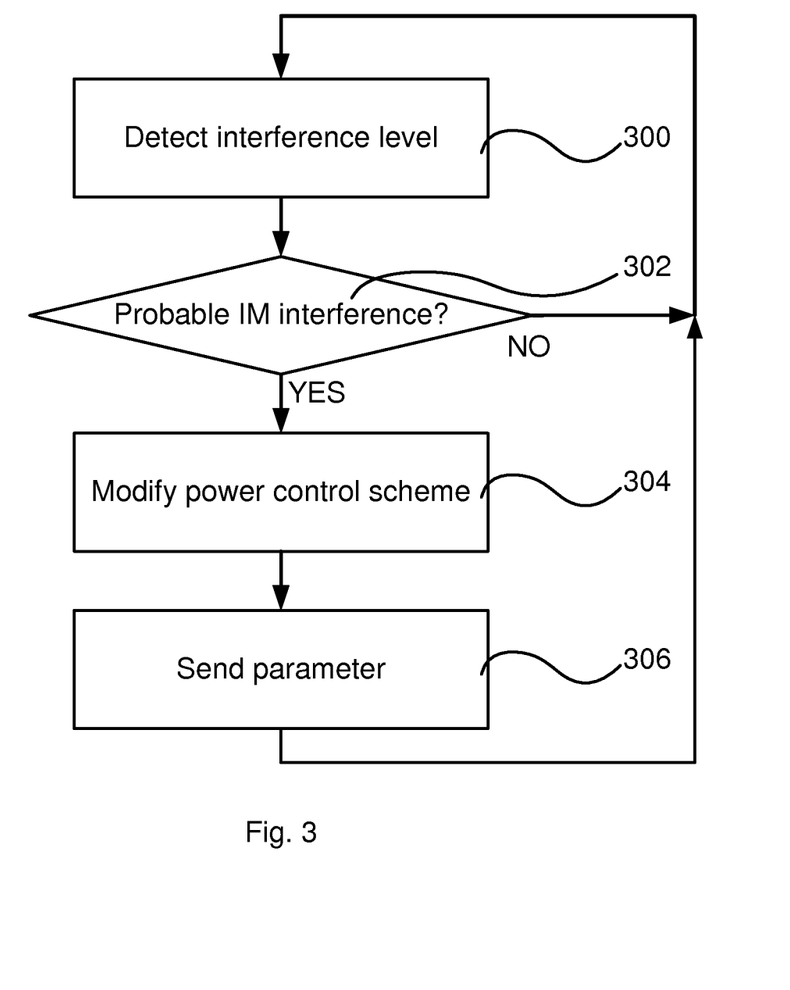
FIG. 3 is a flow chart illustrating a method of handling interference caused by inter-modulation in a network node for wireless communication according to an embodiment.

FIG. 3 is a flow chart illustrating a method of handling interference caused by inter-modulation. The method includes detecting 300 an interference level on an uplink carrier frequency band for one or more stations, and determining 302 whether the interference level indicates probable inter-modulation interference. The detecting and determining 300, 302 may be performed in different ways, among some examples are demonstrated with reference to FIGS. 6 and 7 below. If the interference level does not indicate probable inter-modulation interference (NO in 302), the interference level may be continued to be monitored. If the interference level indicates probable inter-modulation interference (YES in 302), the method proceeds with modifying 304 a power control scheme for the station(s), and sending 306 a parameter set based on the modified power control scheme to the station(s).

The modifying 304 of the power control scheme may be based on a metric of the determined interference level. For example, the network node may modify the power control scheme to force the station(s) to use higher transmit power than without the interference. In one embodiment, the network node adjusts a parameter $P_0$, of the parameter set, assigning an average received power target of the power control scheme and sends the updated value to one or several stations. In a typical embodiment, the increased $P_0$ is only transmitted to stations being severely impacted by the interference. The network node may for example choose to increase the $P_0$ with an amount based on a maximum value of the interference level estimated at the network node, e.g. the same amount. The interference component estimated to emanate from inter-modulation is typically load dependent, but the current load on downlink transmissions may be unknown since they may be performed for example by other operators. The NW node may then choose to only partly compensate for the interference. The parameter $P_0$ may be used to compensate for an increased average interference, and the average interference level may then be used as input to the algorithm.

In another embodiment, which may be combined with the approach demonstrated above, the network node may choose to adjust other parameters in the power control algorithm. For instance, the network node may then send a closed-loop adjustment, also using the knowledge of its instantaneous downlink transmissions as an input to the algorithm. That is, the closed loop adjustments are made considering downlink transmissions at corresponding time instants. In case the network node's own downlink transmissions are expected to affect the interference level in sense of inter-modulation, i.e. a high load downlink transmission is scheduled, a higher interference level can be expected, and the station's power should be increased, and vice versa. Thus, if no downlink transmissions are scheduled, the interference is expected to be low or zero, and the station can use a lower transmit power. This kind of information may thus be used for adapting the closed loop power adjustment.

For example, in the LTE case the power control adjustments may apply both to Physical Uplink Control CHannel, PUCCH, and to Physical Uplink Shared CHannel, PUSCH.

The setting of a parameter, of the parameter set, assigning an average received power target of the power control scheme may be based on a maximum interference level. In such case, the maximum level of the interference level should be determined.

The setting of a parameter, of the parameter set, assigning an average received power target of the power control scheme may be based on the average interference level. In such case, the average level of interference level should be determined.

Not only the absolute value of the interference may be observed; the determination may as well be made based on variations in the interference level, i.e. an increase in interference level may be a sign of occurring inter-modulation. Thus, for the discussion above where the term "interference level" is mentioned, the similar applies substituting it with "increase of interference level".

Figure 4:
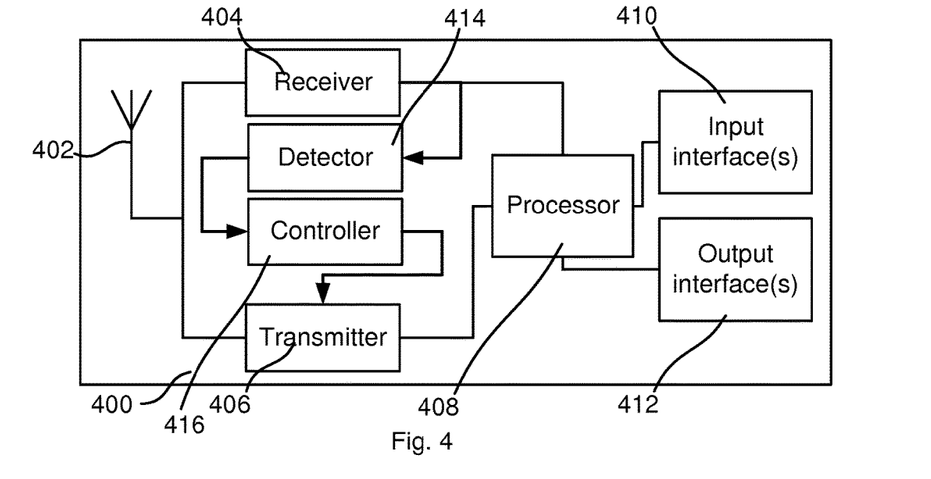
FIG. 4 is a block diagram schematically illustrating a network node according to an embodiment.

FIG. 4 is a block diagram schematically illustrating a NW node 400 according to an embodiment. The NW node 400 comprises an antenna arrangement 402, a receiver 404 connected to the antenna arrangement 402, a transmitter 406 connected to the antenna arrangement 402, a processing element 408 which may comprise one or more circuits, one or more input interfaces 410 and one or more output interfaces 412. The interfaces 410, 412 can be user interfaces and/or signal interfaces, e.g. electrical or optical. The NW node 400 is arranged to operate in a cellular communication network, e.g. as a base station operating a cell. In particular, by the processing element 408 being arranged to perform the embodiments demonstrated with reference to FIGS. 2 and 3, the NW node 400 is capable of handling inter-modulation interference issues. The processing element 408 can also fulfill a multitude of tasks, e.g. signal processing to enable reception and transmission since it is connected to the receiver 404 and transmitter 406, executing applications, controlling the interfaces 410, 412, etc.

The NW node 400 may comprise an interference level detector 414 arranged to detect an interference level on the uplink carrier frequency band for a subset of stations of the set of stations. The interference level detector 414 is thus connected to the receiver 404 to be able to gain levels and information for performing its task. The interference level detector 414 is illustrated as a separate functional element, but may be implemented within the processing element 408 in some embodiments. The NW node 400 may further comprise a controller 416 arranged to determine whether the interference level indicates probable inter-modulation interference. The interference level detector 414 and controller 416 may thus determine if inter-modulation issues exist, which may be performed according to any of the examples given below. The controller 416 is further arranged to, if the interference level indicates probable inter-modulation interference, to perform the method as demonstrated with reference to FIG. 3. The controller 416 is illustrated as a separate functional element, but may be implemented within the processing element 408 in some embodiments.

Figure 5:
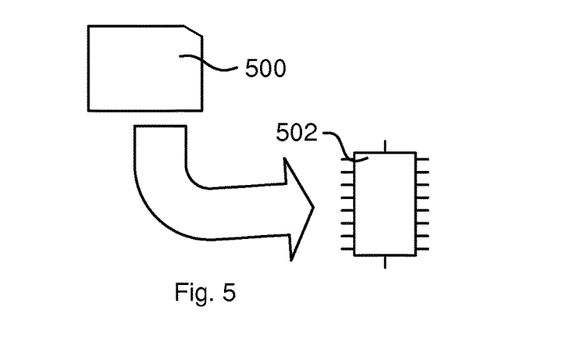
FIG. 5 schematically illustrates a computer-readable medium and a processing device.

The methods according to the present invention is suitable for implementation with aid of processing means, such as computers and/or processors, especially for the case where the processing element 408 and/or controller 416 demonstrated above comprises a processor handling interference caused by inter-modulation in a network node for wireless communication capable of frequency division duplex communication with a set of stations for wireless communication, as demonstrated above. Therefore, there are provided computer programs, comprising instructions arranged to cause the processing means, processor, or computer to perform the steps of any of the methods according to any of the embodiments described with reference to FIG. 3. The computer programs preferably comprises program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to FIG. 3. The computer 502 and computer program product 500 can be arranged to execute the program code sequentially where actions of the any of the methods are performed stepwise. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

The above demonstrated approach is based on the knowledge or probability that one or more UEs which are affected by inter-modulation issues, and handling them as described above. However, consider that inter-modulation issues are determined for one or some UEs based on high interference that seems probable to emanate from inter-modulation. The issues may also be present for UEs that the NW node not has been able to determine interference and it probable cause for, e.g. due to too high interference. For this kind of issue, the NW node may, when inter-modulation issues are determined to be probable for some UEs, perform the similar approach as above but for a general set of UEs.

Figure 2:
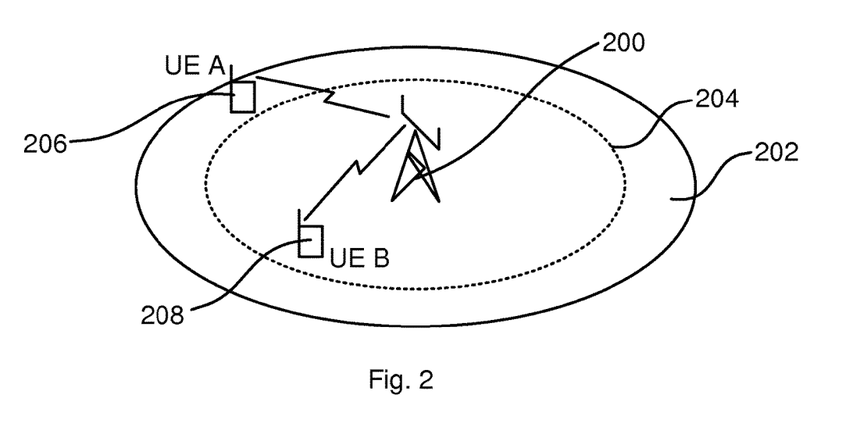
FIG. 2 schematically illustrates a base station operating a cell and how inter-modulation degradation may limit the range of the base station.
Figure 6:
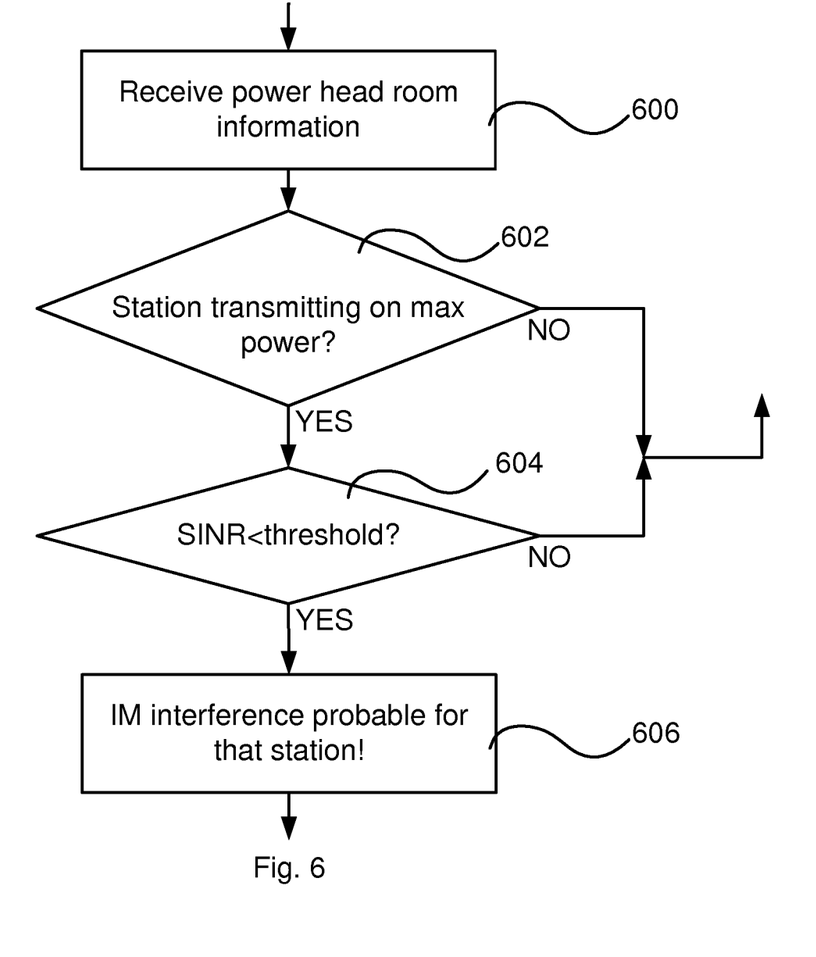
FIG. 6 illustrates an example on a method of determining whether interference caused by inter-modulation is present.

FIG. 6 is a flow chart illustrating an example of a method for determining whether inter-modulation interference is probable (and significant) for a particular station. As demonstrated above, the probability is determined on what knowledge the NW node has about different situations, e.g. from signaling, measurements, states, etc. The approach below illustrates, in the context of LTE, one way of determining the probability based on a few available figures, but similar approaches are equally applicable where other types of information are available, e.g. in the context of other communication systems. Referring to FIG. 2, for better understanding what is demonstrated with reference to FIG. 6, the UE A 206 will be identified as having probable inter-modulation issues which are significant, while the UE B 208 will not be targeted by the approach demonstrated with reference to FIG. 6 below.

The network node receives 600 information from the UE on power headroom. This is normally presented by the UE at some occasions, e.g. at a quickly changing path loss or periodically, and indicated if the UE is able to transmit at a higher power level, and possibly how much higher. From this, the NW node may determine 602 if the UE is transmitting on its maximum power. If it is not, too low power applied at the UE may be the cause of too low signal-to-interference-and-noise ratio, SINR, and the inter-modulation interference is not considered the probable cause, and the method may proceed without taking any actions against inter-modulation interference. If the UE is determined to be transmitting at its maximum power, the SINR is checked against a threshold. For example, the threshold may be chosen a few dB, e.g. 2-3 dB, below a standard or expected SINR level of the NW node receiver. The threshold may for example be in the magnitude of 10 dB. If the SINR is above the threshold, interference is not (anymore) considered to be an issue, and the method may proceed without taking any actions against inter-modulation interference. On the other hand, if SINR is below the threshold, inter-modulation interference is determined 606 to be probable for that UE. In summary, if the UE is known to transmit at full power and the SINR still does not reach a threshold, interference is an issue and considered to be inter-modulation interference issue, since other mechanisms in a cellular communication network, e.g. mobility measurements handling this by for example handover etc., are presumed to take care of other noise and interference issues, such as inter-cell interference. A further or alternative check that is feasible is whether there is a frequency relation between the UL carrier frequency band and the possibly interfering DL carrier frequency band such that any harmonics of the DL carrier frequency band may interfere with any signals on the UL carrier frequency band.

Figure 7:
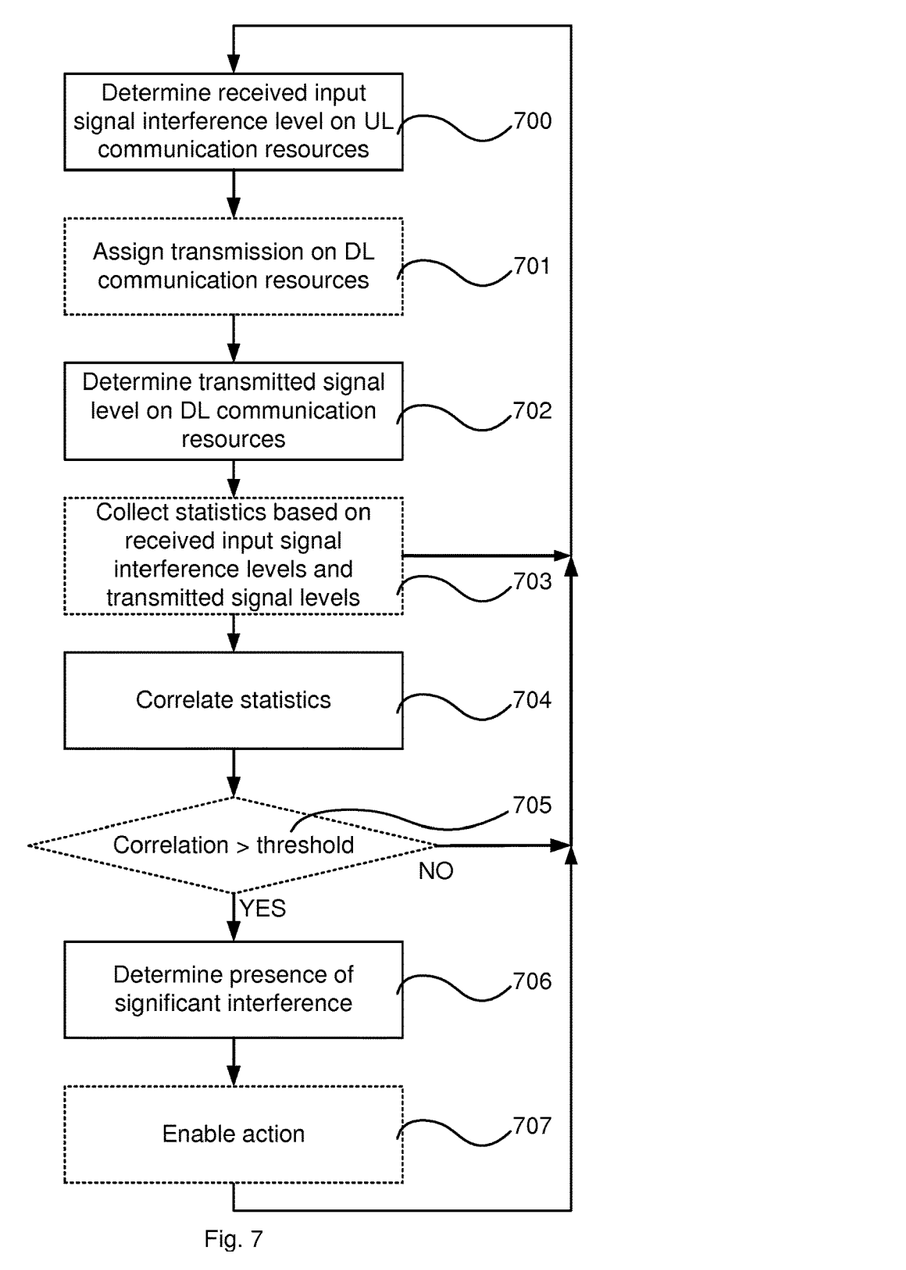
FIG. 7 illustrates an example on a method of determining whether interference caused by inter-modulation is present.

FIG. 7 is a flow chart illustrating an example of a method for determining whether inter-modulation interference is probable (and significant). The method includes determining 700 received input signal interference level on uplink, UL, communication resources. The UL communication resources may correspond to an entire transmission time interval or selected parts thereof. The selected parts thereof may be selected such that those parts do not include any data transmission which facilitates the determination of the interference level since the nominal signal level of the received signal then is reasonably known. If determination is to be made on signals including data transmissions, the determination may rely on statistics or other information to estimate the interference level. The determination 702 of interference level may also include "active" silence, i.e. the method may arrange that no schedule for an uplink transmission grant for the stations is made during a particular transmission time interval, wherein all of the received signals are some kind of interference.

The method also includes determining 702 a transmitted signal level on at least a part of communication resources for downlink communication. The at least part of communication resources for downlink communication should correspond in time with the at least part of communication for uplink communication to be able to determine if the transmitted signal affects the interference level of the received signal. The corresponding time may for example be defined by corresponding subframes or transmission time intervals.

Both the received signal and the transmitted signal should be known and/or under control of the entity performing the method. This may be the case when the entity is one network node. This may also be the case when more than one network node, where one does the receiving and another does the transmitting referred to above, are involved but are under control by e.g. a common controller. A network node in this context may operate on one or more frequency bands, e.g. one frequency band for both receiving and transmitting, one frequency band for transmitting and receiving and another frequency band for transmitting or receiving, or one or more frequency bands for respective transmitting and receiving. Thus, the network node(s) may operate in time division duplex, TDD, frequency division duplex, FDD, and/or with carrier aggregation, wherein different relations may occur when a received channel may be interfered by inter-modulation from a transmitted channel in a network node site comprising a set of network nodes, i.e. one or more, capable of wireless communication with a set of stations for wireless communication.

For determining such relations where the received signal is interfered by inter-modulation introduced by a transmitted signal which is under control by the entity performing the method, the method correlates 704 statistics from the determined received input signal interference level and the determined transmitted signal level. This may be performed for any relations between received signals and transmitted signals which are under control by the entity performing the method.

Based on the correlations, it is determined 706 whether significant interference is caused by inter-modulation introduced by the transmitted signal which is under control by the entity performing the method. If such significant interference is determined present, the predetermined action may be taken 707, i.e. as demonstrated with reference to FIG. 3. The predetermined action may for example include assigning communication resources such that communication is less affected by the interference.

The determination whether significant interference is caused, as stated above, may include comparing 705 a correlation metric value provided by the correlation 704 with a threshold, wherein a correlation metric value exceeding the threshold indicates that the significant interference is present while if the correlation metric value is below the threshold, the method continues to monitor 700, 702 received input signal interference levels and transmit signal levels.

Statistics based on the received input signal interference levels and transmitted signal levels may be collected 703 over time, as indicated by the arrow returning to the determination step 700, to provide sufficient statistics to correlate 704. The statistics may be collected 703 locally or may be collected 703 by aid of remote elements comprising database and processing means. For example, the element performing the method may comprise an interface arranged to provide the determined received input signal interference level and transmitted signal level to a statistics mechanism of the remote element, or a statistics mechanism of the element performing the method. For making the correlation the correlation 704, the statistics to be correlated are received from the statistics mechanism and the correlations are done 704 thereon.

The monitoring and building of statistics may for example be an ongoing process as transmissions and receptions are performed in the network node site while the correlating and determining may be performed periodically. However, the monitoring and building of statistics may also be made periodically, wherein the period for monitoring may be equal or shorter than the period for the correlating and determining whether significant interference is present.

To enhance the statistics, it may be desired to provide a variety of transmit signal levels to the monitored set. Therefore, transmission on the DL communication resources may be assigned 701 such that this variation is achieved. This may comprise selecting the transmit level to e.g. substantially full transmit power level for the network node transmitting the signal for at least some of the time instants, and substantially minimum transmit power level for the network node transmitting the signal for at least some of the time instants. Full transmit power level may for example be provided by ensuring that the communication resources, which may be defined by time, frequency and/or code, are completely filled, which may require filling with dummy information. Minimum transmit power level may for example be provided by only transmitting mandatory reference signals etc. and possibly with reduced power level, i.e. not scheduling any traffic on the communication resources in question. The variation may also be achieved by normal variation in transmissions. The determination 702 of transmitted signal level may for example be provided from information on utilization of the communication resources.

The invention claimed is:

1. A method of handling interference caused by inter-modulation in a network node site, the network node site comprising a set of network nodes for wireless communication capable of communication with a set of stations for wireless communication, wherein the stations are wireless transceiver devices and communication from the network node to any of the stations is considered to be downlink communication and communication from any of the stations is considered to be uplink communication, the method comprising:
   detecting an interference level on an uplink carrier frequency band for a subset of stations of the set of stations;
   determining whether the interference level indicates probable inter-modulation interference; and
   in response to the interference level indicating probable inter-modulation interference:
   modifying a power control scheme for the subset of stations, wherein the modifying of the power control scheme is based on a metric of the determined interference level and knowledge about downlink transmissions at corresponding time instants; and
   sending a parameter set based on the modified power control scheme to the subset of stations.

2. The method of claim 1, further comprising:
   determining a maximum level of interference level; and
   setting a parameter, of the parameter set, assigning an average received power target of the power control scheme based on the maximum interference level.

3. The method of claim 1, further comprising:
   determining an average level of interference level; and
   setting a parameter, of the parameter set, assigning an average received power target of the power control scheme based on the average interference level.

4. The method of claim 1, further comprising:
   setting a parameter, of the parameter set, assigning an incremental closed-loop power adjustment based on the knowledge about the downlink transmissions.

5. A non-transitory computer readable recording medium storing a computer program product for handling interference caused by inter-modulation in a network node site, the network node site comprising a set of network nodes for wireless communication capable of communication with a set of stations for wireless communication, wherein the stations are wireless transceiver devices and communication from the network node to any of the stations is considered to be downlink communication and communication from any of the stations is considered to be uplink communication, the computer program product comprising software instructions which, when run on processing circuitry of a first network node of the network node site, causes the network node to:
   detect an interference level on an uplink carrier frequency band for a subset of stations of the set of stations;
   determine whether the interference level indicates probable inter-modulation interference;
   in response to the interference level indicating probable inter-modulation interference:

modify a power control scheme for the subset of stations, wherein the power control scheme is modified based on a metric of the determined interference level and knowledge about downlink transmissions at corresponding time instants; and send a parameter set based on the modified power control scheme to the subset of stations.

6. A network node for wireless communication capable of communication with a set of stations for wireless communication, wherein the stations are wireless transceiver devices and communication from the network node to any of the stations is considered to be downlink communication performed on a downlink carrier frequency band and communication from any of the stations is considered to be uplink communication performed on an uplink carrier frequency band, the network node comprising:

processing circuitry configured to:

detect an interference level on an uplink carrier frequency band for a subset of stations of the set of stations;

determine whether the interference level indicates probable inter-modulation interference; and in response to the interference level indicating probable inter-modulation interference:

modify a power control scheme for the subset of stations, wherein the processing circuitry is configured to modify the power control scheme based on a metric of the determined interference level and based on knowledge about downlink transmissions at corresponding time instants; and set a parameter set based on the modified power control scheme for the subset of stations; and a transmitter operatively connected to the processing circuitry and configured to send the parameter set to the subset of stations.

7. The network node of claim 6, wherein the processing circuitry is configured to:

determine a maximum level of interference level; and set a parameter, of the parameter set, assigning an average received power target of the power control scheme based on the maximum interference level.

8. The network node of claim 6, wherein the processing circuitry is configured to:

determine an average level of interference level; and set a parameter, of the parameter set, assigning an average received power target of the power control scheme based on the average interference level.

9. The network node of claim 6, wherein a parameter, of the parameter set, assigning an incremental closed-loop power adjustment is based on the knowledge about the downlink transmissions.

* * * * *